United States Patent Office 2,810,655
Patented Oct. 22, 1957

2,810,655

PROCESS AND COMPOSITION FOR IMPROVING CASEIN

Robert B. Dean, Bainbridge, N. Y., assignor to The Borden Company, New York, N. Y., a corporation of New Jersey No Drawing. Application January 11, 1954,
Serial No. 403,431

2 Claims. (Cl. 106—146)

The invention here disclosed is a process for improving the physical and chemical properties of proteins, especially for use in cements, by the procedure of roll milling into moist protein on hot, differential-speed rolls, significant proportions of a polyphosphate, to modify and reduce the viscosity of solutions prepared therefrom and to increase the dry strength of an adhesive prepared from the processed protein.

Casein is a typical protein separated from milk, which has been used for a great many purposes not the least of which is its use as an adhesive for a wide range of adhesive functions such as gluing wood members together, coating paper especially with clay, pasting labels onto cans, bottles, or packages, improving the adhesion of paint, sizing paper and paperboard, and the like. It is found, however, that there are many differences in both physical and chemical properties in caseins derived from different sources and by different processes. In particular, it is found that different methods of precipitating the casein, such as by acid or rennet, markedly alter the physical properties of the resulting casein. In addition, the casein varies according to the sources from which the milk is derived, apparently in part according to the pasturage and food differences. Furthermore, differences in storage and handling methods make considerable differences in the properties of the resulting casein, particularly casein which has been stored for long periods or made from poorly cared-for milk, which casein is apt to be of relatively low grade, poorly soluble, of poor body, poor dry strength and poor adhesivity. Many attempts have been made to upgrade poor casein by the addition thereto of many substances, among which there have been included various of the simple phosphates, and a certain proportion of phosphate compounds is present in practically all caseins, but the addition of simple phosphates has been found to produce little or no effect on the adhesive properties of the casein.

According to the present invention, it is found that if moist casein is treated on a roll mill with small amounts of a poly-phosphorus compound, very great and unexpected improvement in the properties, especially the adhesivity, of the casein can be obtained. For this purpose, it is found that the simple phosphates are ineffective and there are required the polyphosphates of higher molecular weight than the simple compounds. It is further found that these polyphosphates must be added on the rolling mill to the lightly moistened casein, and addition to the milk before precipitating the casein is ineffective. It is desirable that the rolls of the mill be heated and that they be run at different peripheral speeds, so as to cause shearing and continued mixing, and that the phosphate compound be added to the casein either before the casein has been rolled or simultaneously with the addition of the moist casein onto the rolls. The rolls are desirably heated somewhat and the casein mixture is rolled, on the mill, until its granular texture is lost and it has been converted to a smooth sheet of homogeneous material of sufficient strength of "band" on the rolls. This procedure of rolling the casein in the presence of the polyphosphates yields a very great and valuable improvement in the physical properties of the casein and its solutions and in the resulting set adhesive.

By this procedure, the casein is greatly improved in its viscosity and in its ability to hold pigments such as clay, lithopone, titanium dioxide, barites and similar pigments. In addition, the viscosity is modified in such a way as to permit of the utilization therein of much higher proportions of pigment than is previously possible, without loss of the "wax pick strength" of the coating on the paper. Other objects and details of the invention will be apparent from the following description.

Broadly, the present invention consists of the process of rolling proteins between differential-peripheral-speed rolls at a temperature ranging between about room temperature and 250° F., the preferred temperature range being between about 140° F. and 200° F., in the presence of from 1% to 10% of a polyphosphate salt, the optimum amount being approximately 3% on the total mixture. The rolls are desirably set with a separation of from 0.03″ to 0.25″, depending upon the roll size, the character of the protein, the batch size and the operating temperature. The rolling time may be quite short—most proteins will "band" on the roll in one minute or less, and in some instances, the rolling is finished as soon as the mixture has "banded." With some particularly stubborn proteins from 10 minutes to 15 minutes of rolling may be required; but rolling for longer than about 30 minutes is usually contraindicated and may do harm rather than good to the protein. The optimum rolling time usually lies between 2 and 5 minutes. It may be noted that some freshly curded proteins contain sufficient moisture for the rolling operation, but as a rule, it is desirable to age the moist protein briefly. The aging must not be long enough to permit of the formation of mold, and the total amount of uncombined water, as such, in the protein desirably lies within the range between about 3% and about 40% or 50%. Less than about 3% retards the reaction and makes the protein extremely difficult to roll; more than about 50% also retards the reaction and yields a semi-slurry which bands with considerable difficulty and requires unduly long rolling time.

When the rolling is completed, the band may be cut across the roll, dropped into the tray, and cooled to room temperature. When cooled, it is a hard, horny material of totally different appearance, texture and properties from the original protein. It is very readily ground or pulverized into grains or powder, which is soluble, as is the original protein in water containing an alkali such as borax, ammonia, sodium or other hydroxides or the like. For use, it may be dissolved, the desired auxiliary substances incorporated thereinto and the solution or solution-suspension used for any of the desired adhesive applications.

The fact that the simple phosphates do not yield this effect, whereas the polyphosphates do, suggests that the reaction depends upon a depolymerization of the polyphosphates to yield either ions or free radicals or other charged particles which are able to combine with the protein molecules, perhaps at some strategic point, to modify very greatly both the physical and chemical properties of the processed protein. It is well known that highly ionized polyelectrolytes are good dispersants. Our invention furnishes a method for attaching additional phosphate ions to protein by chemical bonds. Rolling or other strong mechanical shearing forces break the long chains of polyphosphates leaving reactive ends which attach to the protein. Thus, letting ROH represent a protein molecule and

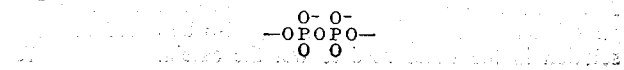

part of a long polyphosphate chain, on rolling one may get fracture and combination as follows:

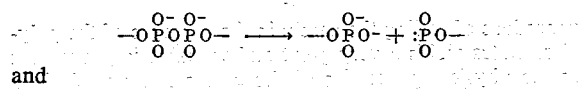
and
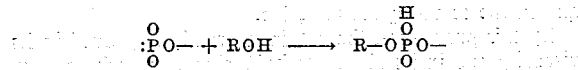

The rolling of protein with short chain polyphosphate molecules such as pyrophosphate does not improve the dispersant action of the protein presumably because the short chains are not broken and no reactive ends are produced which can attach to the protein.

In practicing the invention, the raw material may be any of the usual commercial proteinaceous substances. These include casein as derived from skim milk, vegetable proteins isolated from seedmeals such as soybean meal, or animal proteins derived from blood or otherwise from meat animals.

The principal and preferred raw material is acid precipitated casein, but it may be noted that there are a good many grades of casein and a good many differences in the properties thereof. Freshly acid-precipitated casein is perhaps the best, being low in ash and of good viscosity and strength. The various other forms include such types as rennet casein, self-soured casein, and cooked cured casein. It will be noted that a casein from poorly cared-for milk, precipitated by natural souring and stored for a long time, can be found to be of low solubility, poor viscosity when dissolved, and of low strength as an adhesive.

When a casein material has been selected, the first procedure is to adjust the moisture to an appropriate value. It is usually desirable to moisten it with water to a slightly damp stage, at least about 3% of uncombined water in the casein is highly desirable, and the optimum amount for most caseins appears to be about 20% of uncombined water. For most caseins the minimum amount is found to be about 10% of water and the optimum amount usually lies between 15% and 20%. Care must be taken not to add too much water since, if an excess is added, the casein material becomes merely a fluid slurry which cannot be rolled since it has insufficient body for the rolls to work on. For most caseins, the maximum amount of water is about 50%.

Having moistened the casein to an appropriate moisture content, it is desirably allowed to age for a short time. The aging serves to distribute the moisture more uniformly through the solid casein, and the time of aging may vary from a few minutes to a considerable number of hours or even several days; but care must be taken that the casein does not mold.

The second component of the invention is a polyphosphate. Suitable polyphosphates are metaphosphoric acid or sodium polymetaphosphate, sometimes called sodium hexametaphosphate, and sold under the trade name of "Calgon." Sodium potassium polymetaphosphate is also suitable for our purposes.

It may be noted again that the simple phosphates such as the simple sodium phosphates or the pyrophosphates do not serve in this invention, probably because they are not polymers and do not have a structure which can be broken down by rolling as above pointed out.

When the casein has been properly moistened and aged, it may be placed on the roll mill and the rolling started. The phosphate may be added in any convenient way. It may be mixed with the moist casein before it is placed on the mill, or it may be mixed with the casein as the two are placed on the mill, or the casein may be rolled until it bands, and then the polyphosphate added and mixed in by the usual procedure of cutting the band across the fact of the mill and folding it over onto the added solid phosphate. The polyphosphate may also be added as a solution in the water used to wet the casein.

For the rolling operation, the rolls are preferably set with a clearance of about 0.050" although this optimum spacing varies according to the moisture content in the casein, the quality of the original casein, and various other factors. The variation from batch to batch of casein is so great that it is not possible to give specific instructions, but each batch of casein must be tested to ascertain optimum roll clearance. The rolls are desirably heated, and the preferred roll temperature lies within the range between 100° F. and 200° F. with an optimum value usually at, or near to, 180° F.

The rolls are preferably operated at different speeds thus providing more shearing action on the protein than if they rotated at the same speed. Our invention has been applied to rolls operating at differential speeds in the range of from 1 to 1.125 to 1 to 4, the higher the differential, the more rapid is the action of the polyphosphate on the protein.

Almost any casein, with or without added phosphates, will band on the rolls in from ½ to 4 or 5 minutes, and in many instances the rolling is sufficient and may be terminated almost as soon as the casein has banded. Where the phosphate is mixed in without waiting for the casein to band; this is satisfactory. When it is desirable to add the phosphate after banding, a longer rolling time must be arranged for. In general, the rolling time is determined by the ratio between the cost of power, machine-time and labor, and the increase in value from the improvement in the qualities of the prepared casein.

With the rolls in motion, set for the proper spacing and heated to the proper temperature, the moist casein with or without the appropriate amount of phosphate may be placed in the nip of the rolls. It may be noted that the first portions of casein go through the nip of the rolls and drop into a tray underneath, from which they may be scooped up and returned to the nip of the rolls. In due course, however, the casein becomes gummy and coherent and drops through in the form of a sheet which may be brought around the front roll and returned to the nip of the roll thereby "banding" on the roll. It is desirable for the present invention that the protein shall be milled until it has "banded," and that milling shall be continued under banding conditions for a substantial period of time until the sheet is converted to a horny, semi-translucent film. Normally less than one minute is required to obtain the banded condition, and normally the rolling is completed in three or four minutes. Occasionally, with some caseins the banding and rolling may be completed in a shorter time, as 1½ to 2 minutes; and occasionally for some particularly stubborn proteins, the rolling may need to be extended to intervals as long as 10 minutes, 12 minutes or even 15 minutes, this being particularly the case with poor caseins which need a maximum of up-grading.

When the sheet has assumed a good degree of plasticity and considerable translucency, it may be regarded as finished. The exact length of rolling time depends upon the degree of improvement being sought. The mere sheet formation with the included phosphates may in some instances provide sufficient treatment to effect the desired improvement in the casein. On the other hand, prolonged milling of the sheet may be desirable if a particularly tough casein is desired for gluing purposes with a minimum of added phosphate.

When the sheet has reached the desired condition, it may be cut free from the rolls, flattened and cooled. When so treated, the sheet is a hard, horny, semi-translucent material of considerable solidity and denseness, almost wholly lacking in grain or other texture. When the sheet is cold, it is desirably broken up into small fragments and pulverized, and the small particles are ground into a powder. For most uses, it is preferable that it be ground sufficiently finely to pass 95% through a 30 mesh sieve. When so comminuted, the processed casein is suitable for any of the uses to which high grade raw casein can be put, and in addition to many other uses for which ordinary casein is unsuitable. It is particularly readily soluble, shows an excellent body in solution, and is particularly suitable for the making of casein adhesives.

For the purpose of preparing aqueous solutions of casein or other commercial protein, it is usually desirable to supply an alkali in some form in an amount varying with the strength of the alkali. Thus, borax is commonly employed as a reference alkali in stating the solubility of casein, some particularly high grades of casein requiring only about 12 parts of borax to 88 parts of casein, whereas grades of low solubility casein may require as much as 20 parts or more of borax to 100 parts of mixed casein-borax. The casein prepared according to the present invention can be solubilized by amounts as small as 8 parts of borax.

It may be noted particularly that this procedure greatly improves the ability of casein to hold clay in suspension for such purposes as paper coating and the like. Suspensions of clay prepared with casein rolled and treated with polyphosphates according to the present invention have a considerably lower viscosity per unit of casein than any previously made, and accordingly, a considerably higher amount of clay can be incorporated in a coating with a given amount of casein and coating thickness. In addition, the coated paper shows no loss in "wax pick strength" as outlined in TAPPI method T459M-45.

The details of the processing of casein with polyphosphates are particularly well shown in the following examples:

Example 1

The agent selected for test was sodium polymetaphosphate which, under the trade name "Calgon," has been shown to have a favorable effect upon clay-water paste in the direction of reducing the plastic viscosity. The effect is one of sharply reducing the yield value, or in effect liquifying the system. Sodium polymetaphosphate is therefore not unknown in the art of paper coating, and our invention does not make claim to this chemical per se as an ingredient in clay slurries for coating paper. The discovery on which our invention is based involves the conjoint use of the chemical with casein in a form which is the result of intensive working of the casein in the presence of the chemical, as by the action of differential rolls.

Casein of an acid cured grade was wetted with 25% of its weight of solutions of sodium polymetaphosphate in water, calculated to provide additions of the chemical in increasing amounts stepwise up to and including 5 parts by weight on the casein. These mixtures were milled one after the other on chrome plated steel rolls having a differential speed ratio of 1 to 1.25 and surface temperatures of 100 and 190° F. respectively. The working of the wet casein produced a sheet which was further worked through the rolls for a period of two minutes. The sheet was cooled, dried, broken up and ground. A second series of batches was made up by mixing dried powdered casein with the corresponding quantities of dry powdered sodium polymetaphosphate and was used without further mixing.

As a measure of the effect of the processing, a typical clay coating formula was selected with the several products described above as ingredients to provide a bond for the clay. This coating formula was:

A. *Casein dispersion*: Parts
   Casein _____ 51
   Water _____ 225
   Soda ash _____ 2.6
   Wetting agent (non-ionic) _____ 1.02

The casein was dissolved by heating this mixture to 180° F. Another alkali commonly used for dissolving casein for paper coating is ammonia, which was used alternatively to soda ash in amount necessary to give the same degree of alkalinity to the coating as determined by pH measurement. The pH value of the coating was kept in the range 7.3–7.5 in all tests.

B. *Clay slurry*: Parts
   Paper coating clay _____ 300
   Water _____ 206
   Sodium tetrapyrophosphate _____ 0.75

The clay was dispersed in the water at room temperature with the aid of sodium tetrapyrophosphate as dispersant. When A has cooled down to about 100° F. it is added to B; then C was added to complete the formula.

C. Pine oil: 1.5 parts

The coating compound was milled to smooth it out and was then ready for application to paper.

The Brookfield rotational viscometer was used in measuring the consistency of coatings made with the two series of casein treated with sodium polymetaphosphate. As controls, untreated casein was also used. The viscosity values in centipoises at 80° F. are shown in the following table.

| 45% Solids Clay Coatings, Sodium Polymetaphosphate | 0% | | 2% | | 3% | | 4% | | 5% | |
|---|---|---|---|---|---|---|---|---|---|---|
| | Blended | Rolled | Blended | Rolled | Blended | Rolled | Blended | Rolled | Blended | Rolled |
| Soda ash series: | | | | | | | | | | |
| Viscosity, cps | 2,980 | 7,563 | 3,233 | 3,420 | 2,851 | 2,580 | 5,570 | 2,300 | 6,433 | 2,030 |
| Wax pick values | 9 | 12 | 9 | 12 | 10 | 12 | 11 | 12 | 9 | 12 |
| Ammonia Series: | | | | | | | | | | |
| Viscosity, cps | 2,743 | 5,777 | 3,000 | 1,680 | 3,337 | 1,780 | 3,557 | 1,670 | 3,347 | 1,500 |
| Wax pick values | 9 | 14 | 9+ | 12 | 9+ | 12 | 9 | 12 | 9+ | 12 |

The enhanced effect of reacting the casein with the chemical on the viscosity of the coating was substantial in the case of sodium polymetaphosphate.

Example 2

In this example, metaphosphoric acid was used as the phosphating agent. An acid-cured casein was blended, dry, with calculated amounts of the metaphosphoric acid, added stepwise, to give up to and including 5% by weight on the casein. One part of each of the above lots was saved for further formulation.

The balance of each lot was mixed with 25% water and milled one after the other on chrome plated rolls having a differential speed ratio of 1 to 1.25, and differential surface temperature of 100° to 190° F. The working of the wet casein produced a sheet which was further worked for 2 minutes. The sheet was then dried and ground.

To measure the effect of the processing, a typical clay coating formula was selected with the several products described above as ingredients to provide a bond for clay. This coating formula was:

A. *Casein dispersion:* Parts
   Casein _____ 51
   Water _____ 225
   Soda ash _____ 3.0 to 4.2
     and/or
   Ammonia _____ 3.5 to 4.4
   Wetting agent (non-ionic) _____ 1.02

The casein was dissolved by heating this mixture to 180°

F. and cooling to below 100° F. The pH value of the coating was kept in the range 7.2 to 7.5 in all tests.

B. *Clay slurry:*

| | Parts |
|---|---|
| Paper coating clay | 300 |
| Water | 206 |
| Sodium tetrapyrophosphate | 0.75 |

The clay was dispersed in water at room temperature with the aid of sodium tetrapyrophosphate as dispersant. A was then added to B, and C added to complete the formula.

C. Pine oil: 1.5 parts

The coating was milled to give a uniform mixture and was then ready for application. The Brookfield rotational viscometer was used in measuring the consistency of coatings made with the two series of casein treated with the metaphosphoric acid.

The Dennison Wax pick method was used for bonding tests of the coating to the paper. Viscosity results were obtained at 80° F. The viscosity values in centipoises and wax pick values are shown in the following table.

| 45% Solids Clay Coatings, Metaphosphoric Acid | 0% | | 2% | | 3% | | 4% | | 5% | |
|---|---|---|---|---|---|---|---|---|---|---|
| | Blended | Rolled | Blended | Rolled | Blended | Rolled | Blended | Rolled | Blended | Rolled |
| Soda ash series: | | | | | | | | | | |
| Viscosity, cps | 2,980 | 7,563 | 4,533 | 3,167 | 4,490 | 2,030 | ---------- | 2,390 | 7,203 | 2,127 |
| Wax Pick Values | 9 | 12 | −11 | 11 | 12 | 11 | ---------- | 12 | −12 | 12 |
| Ammonia Series: | | | | | | | | | | |
| Viscosity, cps | 2,743 | 5,777 | 3,003 | 1,130 | 2,237 | 770 | 4,018 | 787 | 5,233 | 890 |
| Wax pick values | 9 | 14 | 11 | −13 | 11 | −13 | 12 | −13 | 12 | −12 |

The great improvement in viscosity with an increase in wax pick value is in contrast to the well-known loss of wax pick strength which accompany the decreased viscosities which are obtained by partial hydrolysis of the casein. This is also a direct contradiction of results found by workers, that compounds containing phosphorus tend to lower the adhesive power of casein.

The process of the present invention thus mills a protein such as casein on roll mills, in which the rolls have different peripheral speeds and different temperatures, in the presence of a polyphosphate to effect a combination or interaction or interplay between the casein and the polyphosphate to effect a substantial increase and improvement in the properties of the protein.

While there are above disclosed but a limited number of embodiments of the present invention, it is possible to provide still other embodiments without departing from the inventive concept herein disclosed, and it is therefore desired that only such limitations be imposed upon the appended claims, as are stated therein or required by the prior art.

The invention claimed is:

1. In making a casein composition, the process which comprises mixing 1–10 parts by weight of an alkali metal polyphosphate, 100 parts of casein, and water within the range 3–40 parts in amount to dampen the casein without converting it to a fluid slurry, subjecting the resulting mixture to shearing and rolling between rollers spaced 0.03–0.25 inch apart and rotated at a peripheral speed of 1.125–4 times as fast for one roller as for the other roller and at a temperature of approximately 140°–250° F. and continuing the shearing and rolling until the mixture becomes non-grainy and, after cooling, hard and horny.

2. A casein composition made in accordance with the process of claim 1.

References Cited in the file of this patent

UNITED STATES PATENTS

| 840,931 | Goldsmith | Jan. 8, 1907 |
| 2,167,202 | Gould et al. | July 25, 1939 |
| 2,360,828 | Craig | Oct. 24, 1944 |
| 2,429,579 | Horvath | Oct. 21, 1947 |
| 2,431,119 | Horvath | Nov. 18, 1947 |
| 2,448,571 | Balch et al. | Sept. 7, 1948 |

FOREIGN PATENTS

| 494,049 | Great Britain | Oct. 19, 1938 |

OTHER REFERENCES

Gottlob's "Technology of Rubber," London 1927, pages 101–4.

"Chemical & Engineering News," 27, 840–843 (Mar. 21, 1949).